United States Patent Office 3,342,675
Patented Sept. 19, 1967

3,342,675
2,4,5-TRICHLOROPHENOL-LOWER-ALKYLAMINE REACTION PRODUCTS AS SKIN GERMICIDES
Marie Adele Josephe Bouillenne-Walrand, Liege, Belgium, and Georges Wetroff, Le Thillay, and Jean Emile Khaladji, Paris, France, assignors to Pechiney, Compagnie de Produits Chimiques et Electrometallurgiques, Paris, France
No Drawing. Filed June 7, 1962, Ser. No. 200,636
Claims priority, application France, June 9, 1961, 864,447
14 Claims. (Cl. 167—58)

This invention relates to the production of a new and improved germicidal production and composition.

It is well known that chlorophenols, such for example as trichlorophenols, possess fungicidal and bactericidal properties but that they cannot be used with human beings or the like higher order of animal life in the treatment of mycoses because of the serious inflammations and outbreaks which occur when they are applied to the skin, even in dilutions as low as 0.01 percent.

The present invention has for an object the production of a product endowed with remarkable germicidal properties and which can be used without noticeable corrosive or caustic action on animal tissue, and it is a related object to provide a process for the preparation of same.

Another object of the present invention is to produce a composition embodying the germicidal product for topical application to the skin to render the skin germicidal It has been found, in accordance with the practice of this invention, that the product resulting from the association by reaction of 2,4,5-trichlorophenol with one or more amino compounds, and preferably triethylamine, can be used to achieve the foregoing objectives. The described reaction product has very interesting germicidal properties and can be used without provoking and cutaneous troubles, such as burns or inflammation of the skin.

The high level of bactericidal activity derived from the described reaction of 2,4,5-trichlorophenol with triethylamine or other amines such as diethylamine, dimethylamine, tripropylamine, dipropylamine, etc., as heretofore described, is incapable of development with the product of the reaction of triethyl or other amine with 2,3,5-trichlorophenol or 2,4,6-trichlorophenol, or other dichlorophenols or halogenated phenols.

In accordance with the preferred practice of this invention, the preparation of the germicidal product is carried out by the association for reaction of the 2,4,5-trichlorophenol and the amine at ambient temperature or at elevated temperature and preferably with the components present in about equal molecular proportions. It is possible to make use of a ratio of components wherein one component is present in an amount slightly greater than an equal molecular ratio. However, when the excess comprises the trichlorophenol component, it should not be employed in an amount in excess of 1.1 mols per mol of the amine.

The germicidal product obtained in accordance with the practice of this invention can be used either in a liquid state as a solution or suspension in a suitable non-toxic medium which may include amino compounds entering into the preparation of the germicidal product. It may be employed as a paste, such for example as an ointment in a non-toxic excipient, or may be employed in a solid state, such as in the form of a powder in admixture with a non-toxic pulverulent carrier.

In such preparations, the active component in the form of the germicidal product described is employed in a concentration within the range of about 0.001 to 5.0 percent by weight and preferably in an amount within the range of 0.01 to 0.1 percent by weight. It is desirable to adjust the pH of the preparation to avoid excessive alkalinity or excessive acidity. This can be accomplished by the use of an acid or base, as the case may be, for neutralization, or it can be accomplished by the use of an amino or preferably by the use of an appropriate buffer solution.

EXAMPLE 1

*Preparation of bactericidal compound*

2,4,5-trichlorophenol is intimately mixed with triethylamine in equal molecular proportions and the reaction is carried out at room temperature.

EXAMPLE 2

*Bactericidal ointment*

|  | G. |
|---|---|
| Bentonite | 13.00 |
| Water | 25.99 |
| Cherry-laurel water | 25.99 |
| Polyethylene glycol 1500 [1] | 21.66 |
| Cetylic alcohol | 1.74 |
| Stearic alcohol | 1.74 |
| Boric acid | 2.75 |
| Burow's solution [2] | 2.60 |
| Sodium salt of sulfate monoesters of higher fatty alcohols (lauryl and myristyl) (Aquarex D) | 0.10 |
| Isopropyl alcohol | 4.33 |
| Product of Example 1 | 0.10 |

[1] Polyethylene glycol 1500: Polyethylene glycol monostearate of molecular weight 500–600.
[2] Burow's solution weight percent composition: Tartaric acid 3.499+acetic acid 5.800+calcium carbonate 7.089+aluminum sulphate 16.11+distilled water 67.502.

It will be apparent from the foregoing that we have provided a new and improved bactericidal composition which enjoys marked effect as a bactericidal agent without being subject to the objectionable characteristics heretofore experienced with phenolics and substituted phenols when employed as bactericidal agents.

It will be understood that changes may be made in the details of the reaction conditions and formulations without departing from the spirit of the invention, especially as defined in the following claims.

We claim:

1. A germicidal agent for topical application to the skin to render the skin germicidal consisting of the reaction product of 2,4,5-trichlorophenol and at least one amino compound combined in substantially equal molecular proportions in which the amino compound is a lower-alkylamine.

2. A germicidal agent for topical application to the skin to render the skin germicidal consisting of the reaction product of 2,4,5-trichlorophenol and triethylamine combined in substantially equal molecular proportions.

3. A germicidal agent as claimed in claim 2 in which the 2,4,5-trichlorophenol is present in an amount in excess of the equal molecular proportion with the triethylamine but not in excess of the amount of 1.1 mols of the 2,4,5-trichlorophenol to 1 mol of triethylamine.

4. A germicidal composition for topical application to render the skin germicidal, the essential component of which consists of the product of the reaction of 2,4,5-trichlorophenol and a lower-alkylamine reacted in approximately equal molecular proportions and a non-toxic pharmaceutical carrier, wherein the reaction product is present in an amount within the range of 0.001 to 5.0 percent by weight of the composition.

5. A germicidal composition as claimed in claim 4 in which the reaction product is present in an amount within the range of 0.01 to 0.1 percent by weight.

6. A germicidal composition as claimed in claim 4 in which the non-toxic pharmaceutical carrier is a liquid.

6. A germicidal composition as claimed in claim 4 in which the non-toxic pharmaceutical carrier is a solid in finely divided form.

8. A germicidal composition as claimed in claim 4 in which the composition is in the form of an ointment.

9. The process for making human skin germicidal comprising topically applying to the skin a composition containing an effective amount of the product of the reaction of 2,4,5-trichlorophenol and a lower-alkylamine reacted in about equal molecular proportions.

10. The process for making human skin germicidal comprising topically applying to the skin a composition containing an effective amount of the product of the reaction of 2,4,5-trichlorophenol and triethylamine reacted in about equal molecular proportions.

11. The process as claimed in claim 10 wherein the trichlorophenol-triethylamine is present in an inert pharmaceutical carrier in an amount within the range of 0.001 to 5.0 percent by weight.

12. The process as claimed in claim 11 in which the inert carrier is in the form of an ointment.

13. The process as claimed in claim 11 in which the inert carrier is in the form of a powder.

14. The process as claimed in claim 11 in which the inert carrier is in the form of a liquid.

References Cited

UNITED STATES PATENTS

| | | | |
|---|---|---|---|
| 1,919,298 | 7/1933 | Lehmann et al. | 260—567.5 |
| 2,253,762 | 8/1941 | Carswell et al. | |
| 2,502,809 | 4/1950 | Vogelsang | 167—38 X |
| 2,650,892 | 9/1953 | Le Fave | 167—31 |
| 2,937,971 | 5/1960 | Shackell | 167—31 |

ALBERT T. MEYERS, *Primary Examiner.*

JULIAN S. LEVITT, *Examiner.*

D. M. MOYER, V. C. CLARKE, *Assistant Examiner.*